(12) United States Patent
Fleischer

(10) Patent No.: US 9,500,207 B2
(45) Date of Patent: Nov. 22, 2016

(54) SLIDE VALVE HAVING A VALVE SLIDE ABLE TO BE IMPINGED UPON BY AN ACTUATOR

(75) Inventor: Walter Fleischer, Bietigheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 191 days.

(21) Appl. No.: 14/237,680

(22) PCT Filed: Aug. 3, 2012

(86) PCT No.: PCT/EP2012/065240
§ 371 (c)(1),
(2), (4) Date: Jun. 12, 2014

(87) PCT Pub. No.: WO2013/020913
PCT Pub. Date: Feb. 14, 2013

(65) Prior Publication Data
US 2014/0326344 A1    Nov. 6, 2014

(30) Foreign Application Priority Data

Aug. 9, 2011  (DE) .......................... 10 2011 080 669
Dec. 1, 2011  (DE) .......................... 10 2011 087 546

(51) Int. Cl.
*F15B 13/04* (2006.01)
*F16H 61/02* (2006.01)
(Continued)

(52) U.S. Cl.
CPC ....... *F15B 13/0402* (2013.01); *F16H 61/0276* (2013.01); *F16K 11/07* (2013.01); *F16H 2061/301* (2013.01); *Y10T 137/8671* (2015.04)

(58) Field of Classification Search
CPC ..................... F16H 61/0276; F16H 2061/301; F15B 13/0402; F16K 11/07; Y10T 137/8671
See application file for complete search history.

(56) References Cited

U.S. PATENT DOCUMENTS

| 5,623,967 | A | * | 4/1997 | Hayashi | .............. | F15B 13/0402 |
| | | | | | | 137/625.64 |
| 6,364,280 | B1 | * | 4/2002 | Stach | .................. | F15B 13/0402 |
| | | | | | | 137/625.69 |

(Continued)

FOREIGN PATENT DOCUMENTS

| CN | 201045361 Y | 4/2008 |
| DE | 19938884 | 2/2001 |

(Continued)

OTHER PUBLICATIONS

International Search Report for PCT/EP2012/065240, issued on Dec. 13, 2012.

*Primary Examiner* — Craig Schneider
*Assistant Examiner* — Kevin Barss
(74) *Attorney, Agent, or Firm* — Norton Rose Fulbright US LLP; Gerard Messina

(57) ABSTRACT

A slide valve is described, having a valve slide, which is able to be impinged upon by an actuator in a first direction and by an impinging device in a second direction, opposite to the first direction, and which, using control sections is able to connect hydraulically a first working connection to an inlet connection or an outlet connection, and a second working connection to an or the inlet connection or an or the outlet connection, a first control section assigned to the first working connection including at least a first and a second subcontrol section and a recess that is situated axially between them and is preferably radially encircling, which is able to connect hydraulically the working connection to an or the outlet connection as a function of an axial position of the valve slide.

7 Claims, 9 Drawing Sheets

(51) Int. Cl.
*F16K 11/07* (2006.01)
*F16H 61/30* (2006.01)

(56) References Cited

U.S. PATENT DOCUMENTS

2003/0221731 A1    12/2003  Ogura et al.
2005/0067031 A1*    3/2005  Lee .................... F15B 13/0402
                                                          137/625.69
2007/0051414 A1*    3/2007  Nakai .................... F16K 11/07
                                                          137/625.69
2009/0078112 A1     3/2009  Eschweiler
2010/0084589 A1*    4/2010  Sen ...................... F15B 13/024
                                                          251/129.01

FOREIGN PATENT DOCUMENTS

DE           10020187       10/2001
WO      WO2006/111031       10/2006

* cited by examiner

SLIDE VALVE HAVING A VALVE SLIDE ABLE TO BE IMPINGED UPON BY AN ACTUATOR

FIELD OF THE INVENTION

The present invention relates to a slide valve, as well as an automatic transmission.

BACKGROUND INFORMATION

Automatic transmissions of motor vehicles are known from the market, in which one or more transmission clutches or positioning cylinders for operating these clutches are used. In particular, double acting hydraulic cylinders are used, which have two hydraulic chambers separated by a piston, and are able to be adjusted actively in both directions of motion by a corresponding pressure action.

In order to switch the hydraulic volume flow, slide valves are used, for example, in a 4/3 design. Such slide valves frequently have a built-in pressure spring ("valve spring") as well as an actuator acting against the pressure spring. The actuator is a solenoid, for example. A specific force equilibrium between the actuator and the valve spring determines a corresponding axial position of a valve slide that is movable in the slide valve.

SUMMARY

An object on which the present invention is based is attained by a slide valve as well as by an automatic transmission. Important features for the present invention are also found in the following description and in the drawings, the features being able to be essential for the present invention both alone and also in different combinations, without further explicit reference being made to it.

The slide valve, according to the present invention, has the advantage that it is able to be operated, using two working connections, in such a way that, when an actuator of the slide valve is not supplied with any energy, both working connections are separated from an hydraulic inlet having a supply pressure and are connected to an hydraulic outlet ("zero shutoff"). In this state, an undesired build-up of a hydraulic pressure at the working connections as a result of leakages may be avoided. Likewise, during operation of the slide valve, the pressure build-up at the respective working connection is able to take place unimpeded. In particular, it is not required that a valve slide, that is axially movable in the slide valve, have axial and/or radial bores. Because of that, energy may be saved and costs lowered, for instance, during operation of a double-acting hydraulic cylinder.

In order to control a piston of the double-acting hydraulic cylinder using the slide valve, in each case one of two hydraulic chambers is impinged upon by the supply pressure of a fluid (hydraulic oil). In this context, at the same time the respectively other chamber is impinged upon by the comparatively low pressure ("vented"), by connecting it to an hydraulic outlet, for example. By contrast, if the piston is not moving (any longer) the supply pressure may be cut off from the hydraulic cylinder using the slide valve, and the two chambers may be connected to the hydraulic outlet. Then the same low pressure prevails in both chambers. Since a possible leakage of fluid, caused by the inlet connection, is able to flow into the hydraulic outlet, the piston is able to remain in its respective position.

The slide valve according to the present invention has a valve slide which is able to be acted upon by an actuator in a first direction and by an impinging device in a second direction that is opposite to the first. The impinging device is preferably an axially acting valve spring, which is designed, for instance, as an helical spring. To control the double-acting hydraulic cylinder, the slide valve has a first and a second working connection, as well as preferably an inlet connection and a first and a second outlet connection (besides the respective working connection). The inlet connection and the outlet connection are able to be connected hydraulically to the respective working connection, as a function of an axial position of the valve slide. For this purpose, the valve slide has corresponding control sections at its circumference. According to the present invention, it is provided that a first control section assigned to the first working connection includes at least one first and one second subcontrol section and a recess that is situated axially between them and is preferably radially encircling. The recess is developed in such a way that, as a function of an axial position of the valve slide, it is able hydraulically to connect the first working connection to an or the outlet connection. This is possible with a comparatively large hydraulic cross section especially in that position in which a hydraulic pressure build-up takes place at the second working connection. It is possible to develop the recess only over a part of the circumference of the valve slide, if necessary.

Furthermore, it is provided that the valve slide has a second control section assigned to the inlet connection, which, as a function of the axial position of the valve slide, is able to connect the inlet connection hydraulically alternatively to the first working connection or to the second working connection. An axial length of the second control section is preferably at least slightly greater than an extension of the inlet connection parallel to a longitudinal axis of the valve slide. Because of this, both control edges of the second control section are able to act directly in the region of the inlet connection. In a mid-position of the valve slide or the second control section, the inlet connection is completely closed. Consequently, the second control section that is assigned to the inlet connection is able to take over the control of the first working connection at least partly, so that the first control section assigned to the first working connection is able to be developed according to the present invention.

One preferred axial positioning of the hydraulic connections of the slide valve according to the present invention provides that, starting from an end section of the valve slide that is impinged upon by the impinging device, the first outlet connection, the first working connection, the inlet connection, the second working connection and a second outlet connection are situated in an axial sequence. Thereby one may describe a particularly simple and expedient specific embodiment of the slide valve.

Alternatively, starting from an end section of the valve slide, which is impinged upon by the impinging device, a second outlet connection, the second working connection, the inlet connection, the first working connection and a first outlet connection are able to be situated in an axial sequence. In this second embodiment of the present invention, may be axially designed to be particularly short, and therefore makes possible a comparatively compact construction. The hydraulic functions of the first and the second working connection are also exchanged with respect to the first embodiment stated above, whereby broadened constructive possibilities come about.

Furthermore, it is provided that a ratio of an axial length of the first control section to an extension of the first working connection parallel to the longitudinal axis of the valve slide has a value of approximately 0.9 to 1.1, corresponding to a formula $$\frac{h\_piston}{h\_channel} = 0.9 \text{ to } 1.1.$$

This describes a first mathematical relationship, which makes it possible, on the one hand, to separate the first working connection effectively from the inlet connection during the "zero shutoff", and on the other hand, to connect it with sufficient cross section to the first outlet connection.

In supplement, it is provided that a ratio of the sum of an axial length of the first and the second subcontrol section and an axial length of a control range assigned to the control section on a longitudinal bore of the slide valve radially guiding the valve slide to an axial length of the first control section has a value of approximately less than, or equal to 0.7, corresponding to a formula $$\frac{a+b+c}{h\_piston} \leq 0,7.$$

This second mathematical relationship may advantageously be used in supplementation to the abovementioned first formula, for the measuring of the slide valve. The ratio described of the axial lengths a, b and c ("sealing lengths") to the axial length h_piston particularly makes it possible to reach a sufficient cross section for the "venting" of the first working connection, particularly during the pressure build-up at the second working connection.

The slide valve is improved further if an axial position and/or an axial measure of the first control section and the first and second subcontrol section and an axial position and/or an axial measure of the second control section and of the third control section with respect to the valve slide are dimensioned in such a way that, if the actuator does not act upon the valve slide, the first working connection is hydraulically connected to the outlet connection and/or the second working connection is hydraulically connected to the outlet connection. Consequently, according to the present invention, an hydraulic "venting cross section" is achieved between the first working connection and the first outlet connection in the currentless state of the actuator, so that both the first and the second working connection are not only separated hydraulically from the inlet connection, but are also in each case connected to the first and second outlet connection, respectively. Thereby both chambers of the double-acting hydraulic cylinder may be set to be essentially pressure-free, or at least to be supplied with an equal low pressure. A piston of the double-acting hydraulic cylinder may thus remain in its current position without the actuator requiring energy for this.

It is further provided that, if the actuator acts upon the valve slide with a first force, the first working connection is hydraulically connected to the inlet connection and the second working connection is hydraulically connected to the outlet connection, and that, if the actuator is acting upon the valve slide with a second force, the first working connection is hydraulically connected to the outlet connection and the second working connection is hydraulically connected to the outlet connection, and if the actuator acts upon the valve slide with a third force, the first working connection is hydraulically connected to the outlet connection and the second working connection is hydraulically connected to the inlet connection. This first embodiment assigns the first control section, and therewith the first and the second subcontrol section, hydraulically to the first working connection, which is situated axially closer to the impinging device than the second working connection. Thereby first possibilities are described for constructively executing the slide valve and for using it for a respective hydraulic control.

A particularly suitable application of the slide valve according to the present invention is the control of a double-acting hydraulic cylinder in an automatic transmission of a motor vehicle. In particular, energy for actuating the actuator may be saved in such phases in which the hydraulic cylinder does not execute a working motion.

DETAILED DESCRIPTION

Figure 1:
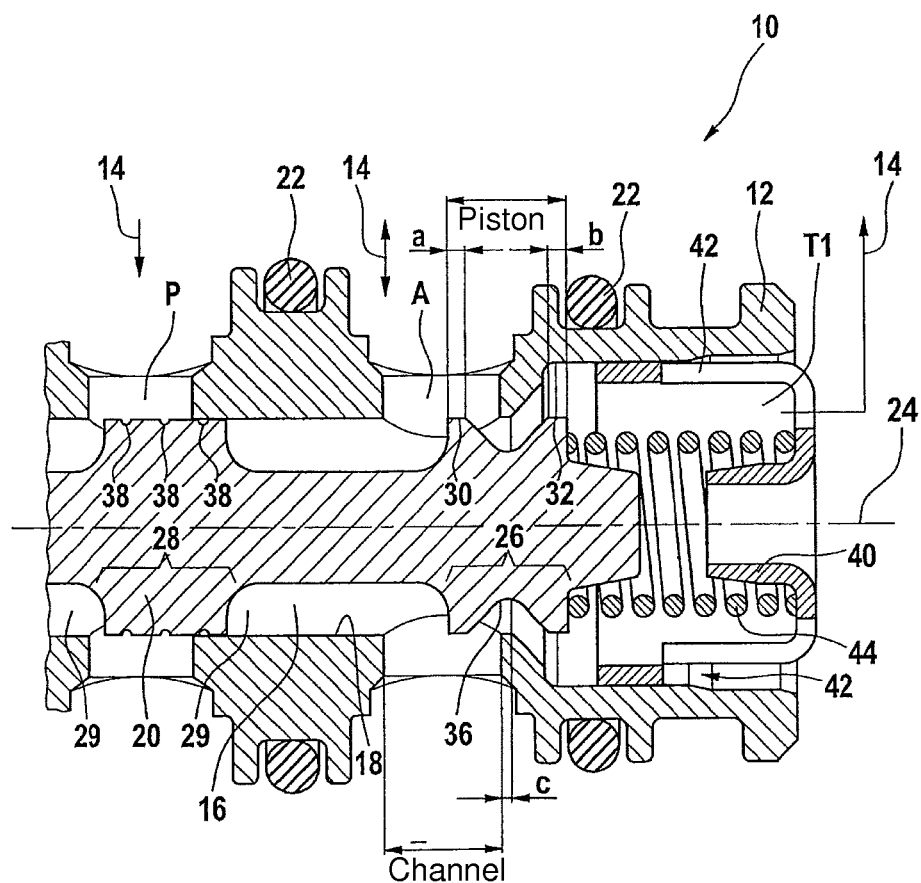
FIG. 1 a first sectional representation of an axial section of a first specific embodiment of a slide valve.

The same reference numerals are used, even in different specific embodiments, for functionally equivalent elements and variables in all the figures.

FIG. 1 shows an axial section of a slide valve 10 of a first specific embodiment in a sectional representation. Slide valve 10 includes a housing 12, which has an inlet connection P, a first working connection A and a first outlet connection T1, in the view of FIG. 1. Inlet connection P and first working connection A are presently designed using radial bores in housing 12. First outlet connection T1 is designed axially on an end section of slide valve 10, at the right in the drawing. Three arrows 14 illustrate the possible flow directions of a fluid 16 at the respective connections. Inlet connection P and first working connection A open out into an axial longitudinal bore 18 of housing 12, in which a cylindrical valve slide 20 is situated in a gliding and guided manner. Furthermore, on its outer side, housing 12 has radially encircling sealing elements 22. The hollow spaces in slide valve 10 that are visible in the drawing are essentially filled with fluid 16 (hydraulic oil). Slide valve 10 and valve slide 20 are executed at least partially rotationally symmetrical about a longitudinal axis 24.

In the view of FIG. 1, valve slide 20 has respectively one first and one second control section 26 and 28, as well as two axially extending, radially encircling recesses 29 situated next to control sections 26 and 28. First control section 26 is situated in an axial surroundings of working connection A, and is thus hydraulically associated with working connection A. First control section 26 has a first subcontrol section 30 having axial length a and a second subcontrol section 32 having axial length b. Axially between first subcontrol section 30 and second subcontrol section 32 there is situated a radially encircling recess 36. A control region of housing 12 associated with subcontrol sections 30 and 32 has an axial length c. An axial distance between the control edges, that are removed at the maximum distance, of subcontrol sections 30 and 32 has an axial length of h_piston. A diameter and an axial opening width of the radial bore associated with working connection A has an extension h_channel parallel to longitudinal axis 24 of valve slide 20.

In the present case, a ratio of the axial length h_piston to extension h_channel amounts to approximately 0.9 to 1.1. Represented as a formula:

$$\frac{h\_piston}{h\_channel} = 0.9 \text{ to } 1.1$$

Moreover, a ratio of the sum of the axial lengths a, b and c to the measure h_piston of first control section 26 has a value of approximately less than, or equal to 0.7. Represented as a formula:

$$\frac{a+b+c}{h\_piston} \leq 0,7.$$

Second control section 28 is situated in axial surroundings of inlet connection P and presently has three radially encircling grooves 38. Furthermore, in an end section, at the right in the drawing, of axial longitudinal bore 18, there is a pot-shaped housing element 40. Housing element 40 has cut-outs 42, through which fluid 16 is able to flow to first outlet connection T1. Moreover, between an inner end face of housing element 40 and an end section, at the right in the drawing, of valve slide 20, there is an axially acting impinging device in the form of a valve spring 44. The function of slide valve 10 is clarified more precisely in the following FIGS. 2 to 5.

It should be understood that the radially encircling recess 36 may also have a different radial measure than the one shown in the drawing. For instance, recess 36 may have a radial measure corresponding to a radius of valve slide 20 in the area of recesses 29. In this case, the one control section 26 together with the two subcontrol section 30 and 32 would appear as separate control sections 26' and 25" (not shown). This distinction would, however, be only of a conceptual type.

Figure 2:
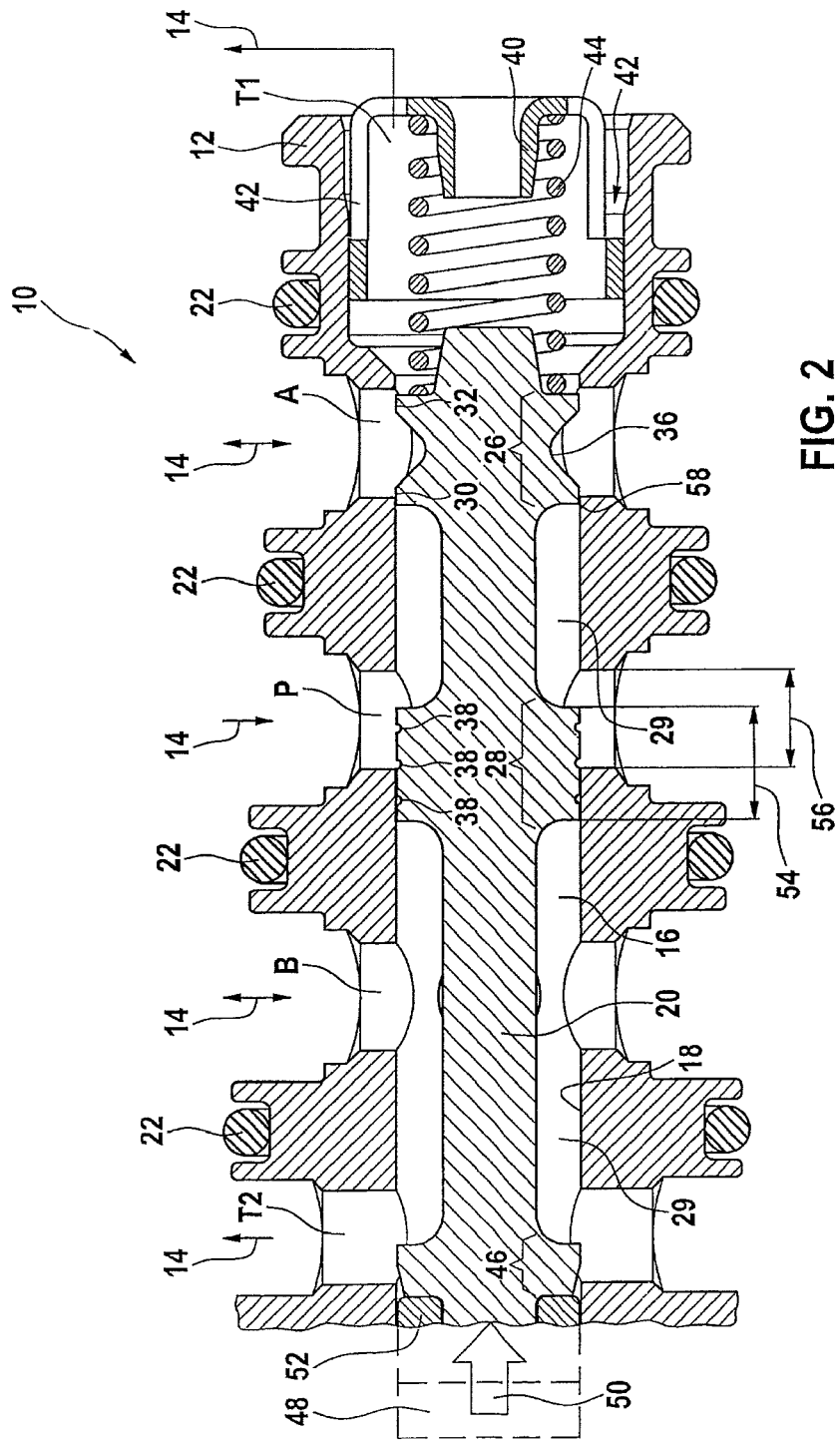
FIG. 2 a sectional view of the slide valve in FIG. 1 in a first position.

FIG. 2 shows a sectional view of slide valve 10, broadened with respect to FIG. 1. In a supplementary manner, in FIG. 2, in the middle left area of the drawing, a second working connection B is shown, as well as a second outlet connection T2 in the outer left area. In an axial surroundings of second outlet connection T2, valve slide 20 has a third control section 46. In an axial surroundings of second working connection B, in contrast, there is no control section associated with working connection B.

At a left end section of valve slide 20 in the drawing of FIG. 2, the former is able to be impinged upon by an axially acting actuator 48, by a pressure force. The direction of action of actuator 48 is characterized by an arrow 50. Actuator 48 may be a solenoid, for example and is shown only symbolically by a box drawn in dashed lines. At the end section of third control section 46, at the left in the drawing, valve slide 20 has impinged upon an annular stop 52 that is fixed to the housing.

Second control section 28 has an axial length 54. A diameter or an axial opening width of inlet connection P has a shorter axial length 56 with respect to axial length 54. This makes it possible that second control section 28 is able to satisfy one of the following three functions as a function of an axial position of valve slide 20:

inlet connection P is opened in the direction of first working connection A;
inlet connection P is opened in the direction of second working connection B; or
inlet connection P is closed.

In FIG. 2, actuator 48 is switched to currentless, and therefore exerts no force on valve slide 20. Thus, valve spring 44 is able to press valve slide 20, at its third control section 46, against annular stop 52. Valve slide 20 is thus located in an end position that is at the left in the drawing. Thereby there comes about the following behavior for slide valve 10:

First outlet connection T1 is hydraulically connected to first working connection A and is thus able to carry off fluid 16. Between second subcontrol section 32 and an edge of housing 12 corresponding to it, a gap-like opening is formed.
First working connection A is hydraulically separated from inlet connection P using first subcontrol section 30. A reference numeral 58 characterizes an associated control edge of first subcontrol section 30.
Inlet connection P is hydraulically separated from second working connection B using second control section 28.
Second working connection B is hydraulically connected to second outlet connection T2.

When first working connection A is connected to a first chamber and the second working connection B is connected to a second chamber of a double-acting hydraulic cylinder (not shown), then, according to the present position of valve slide 20, these two chambers are each hydraulically connected to the first outlet connection T1 and the second outlet connection T2 respectively, and are thus essentially without pressure or have at least an equal slight pressure. A piston of the double-acting hydraulic cylinder is thus able to remain in its current position. For instance, the double-acting hydraulic cylinder is an element of a transmission control of a motor vehicle's automatic transmission, a transmission step having been shifted to and being maintained for a certain time period.

Figure 3:
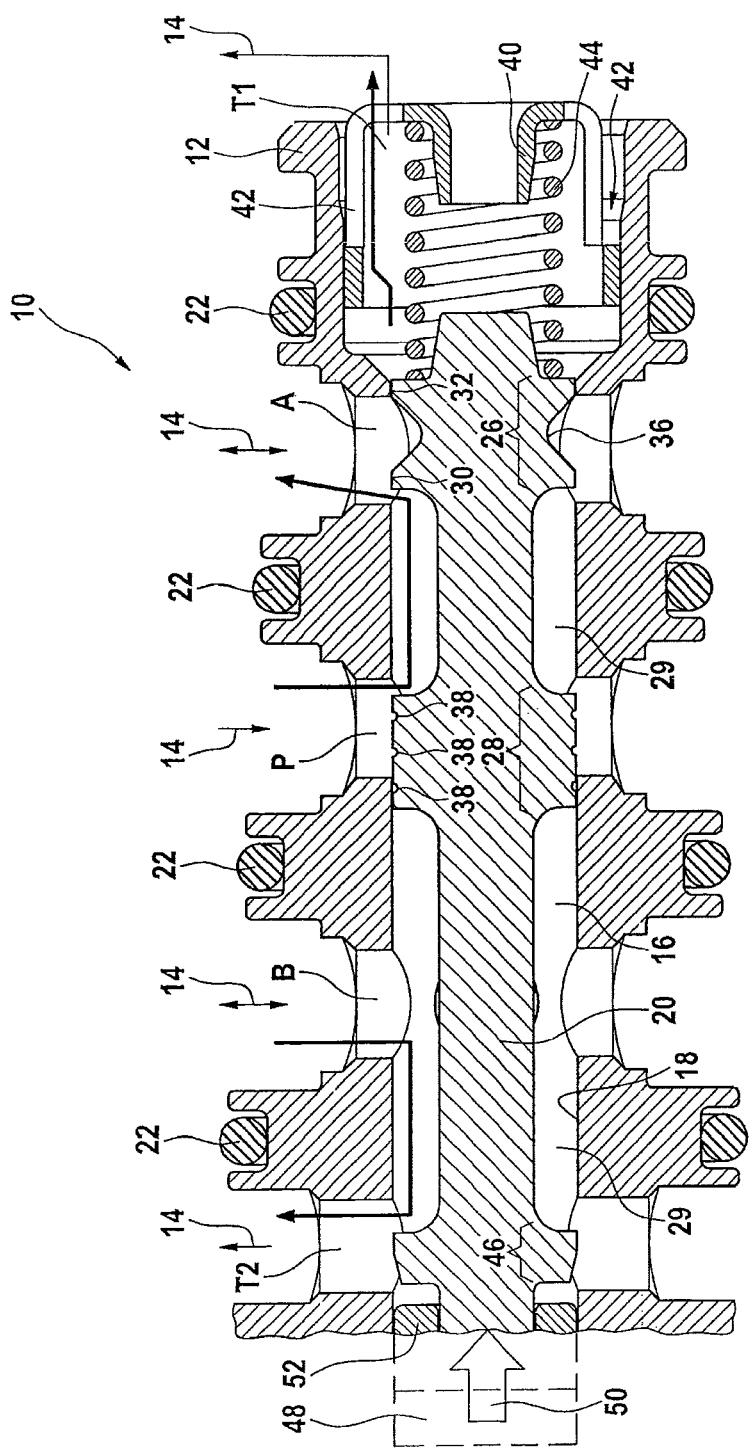
FIG. 3 a sectional view of the slide valve in FIG. 1 in a second position.

FIG. 3 shows slide valve 10 of FIG. 2 in a state in which actuator 48 is being actuated using a first energy or a first current (for instance, about 30% of the maximum current). Because of this, actuator 48 acts upon valve slide 20 using a first force. With respect to FIG. 2, valve slide 20 of FIG. 3 is thus shifted to the right in the drawing by a first measure (not having a reference numeral).

Thereby there comes about the following behavior of slide valve 10:

First outlet connection T1 is hydraulically separated from working connection A using second subcontrol section 32.
First working connection A is hydraulically connected to inlet connection P. Fluid 16 flows along an arrow (having no reference numeral) from inlet connection P to working connection A.

Inlet connection P is also hydraulically connected to first working connection A, but is hydraulically separated from second working connection B using second control section 28.

Second working connection B is hydraulically connected to second outlet connection T2. This is shown in the drawing by an arrow (without a reference numeral).

All in all, a first working motion of the double-acting hydraulic cylinder described above is able to take place, the chamber connected to first working connection A being filled with the supply pressure prevailing at inlet connection P, and the chamber connected to second working connection B being emptied.

Figure 4:
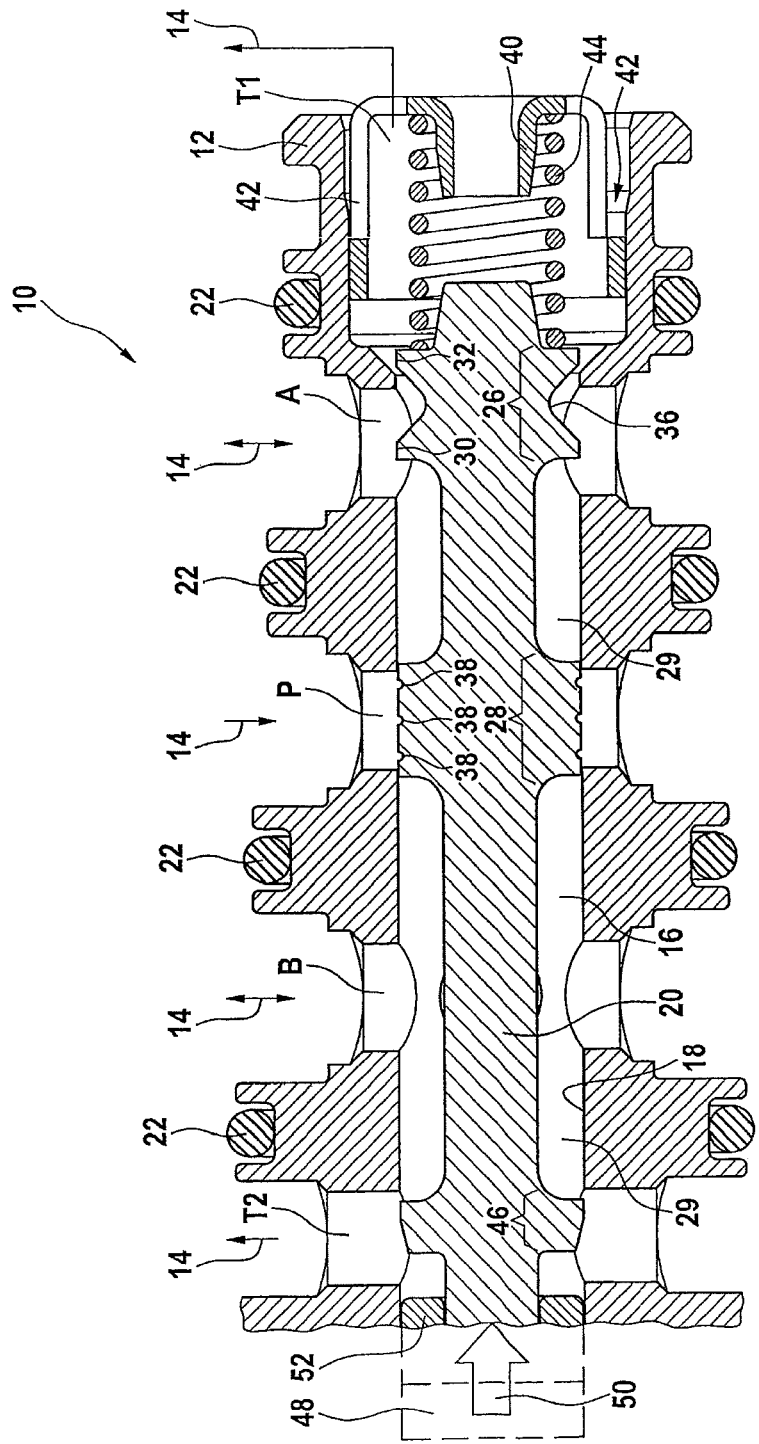
FIG. 4 a sectional view of the slide valve in FIG. 1 in a third position.

FIG. 4 shows slide valve 10 of FIG. 2 in a state in which actuator 48 is being actuated using a second energy or a second current (for instance, about 66% of the maximum current). Because of this, actuator 48 acts upon valve slide 20 using a second force. With respect to FIG. 2, valve slide 20 of FIG. 4 is thus shifted to the right in the drawing by a second measure (not having a reference numeral), which is greater with respect to FIG. 3.

Thereby there comes about the following behavior of slide valve 10:

First outlet connection T1 is hydraulically connected to first working connection A. In this context, fluid 16 flows in the axial direction to the right in the drawing, through radially encircling recess 36 of first control section 26.

Inlet connection P is hydraulically separated from first working connection A and from second working connection B using second control section 28.

Second working connection B is hydraulically connected to one of recesses 29.

Second outlet connection T2 is hydraulically connected to the same recess 29, so that fluid 16 is able to flow from second working connection B to second outlet connection T2.

Altogether, there thus comes about a "mid-position" of slide valve 10 and a similar hydraulic effect to that in FIG. 2.

Figure 5:
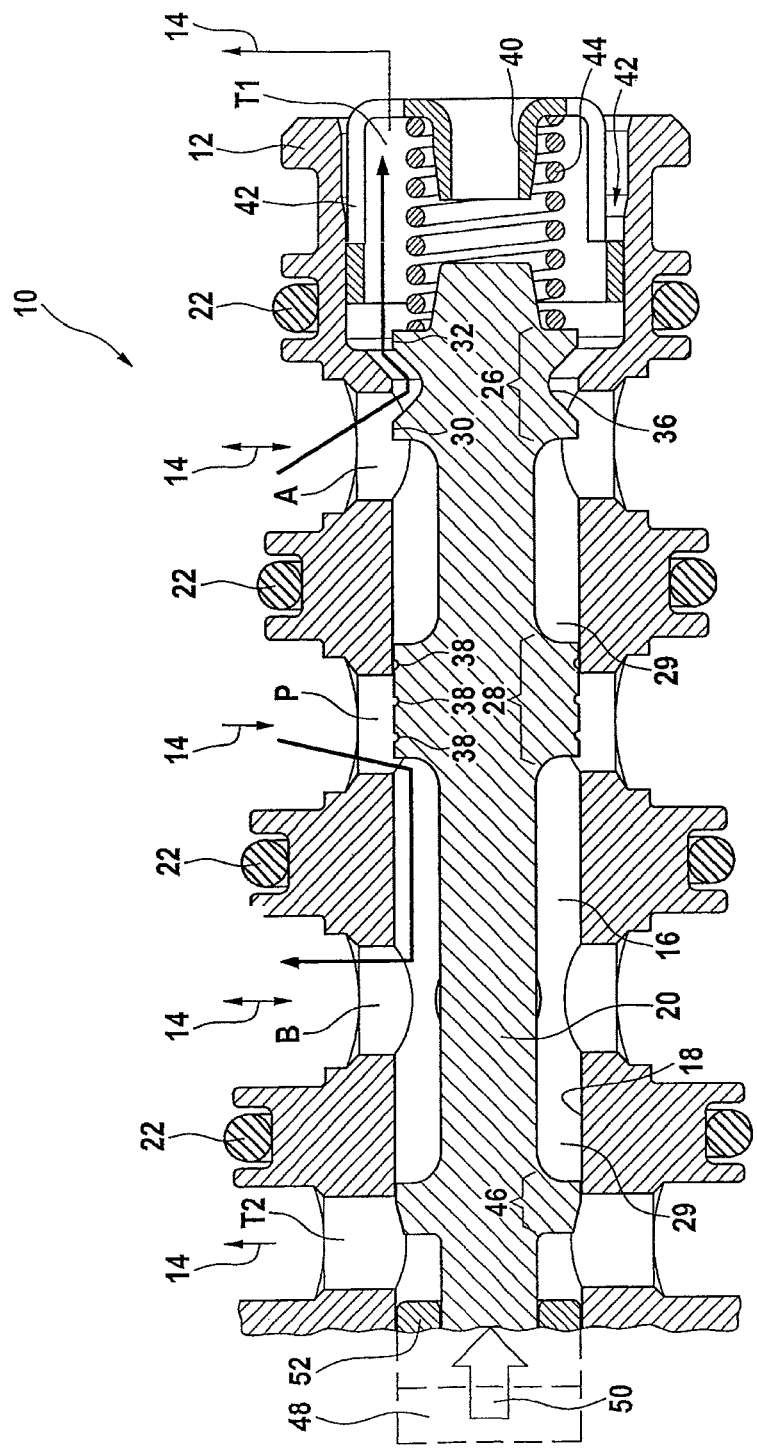
FIG. 5 a sectional view of the slide valve in FIG. 1 in a fourth position.

FIG. 5 shows slide valve 10 of FIG. 2 in a state in which actuator 48 is being actuated using a third energy or a third current (for instance, 100% of the maximum current). Because of this, actuator 48 acts upon valve slide 20 using a third force. With respect to FIG. 2, valve slide 20 of FIG. 5 is thus shifted to the right in the drawing by a third measure (not having a reference numeral), which is greater with respect to that in FIG. 4.

Thereby there comes about the following behavior of slide valve 10:

First outlet connection T1 is hydraulically connected to first working connection A. Similarly to FIG. 4, fluid 16 flows in the axial direction to the right in the drawing, through radially encircling recess 36 of first control section 26. This is shown in the drawing by an arrow.

Inlet connection P is hydraulically separated from first working connection A, but opened towards second working connection B.

Second working connection B is hydraulically connected to inlet connection P via one of recesses 29 and is hydraulically separated from second outlet connection T2 by third control section 46.

Consequently, all in all, a second (opposite the first) working motion of the double-acting hydraulic cylinder described above is able to take place, the chamber connected to first working connection A being emptied, and the chamber connected to second working connection B being filled with the supply pressure prevailing at inlet connection P.

It stands to reason that the arrangement and/or the sequence and/or the number of working connections A and B, of inlet connection P or inlet connections P, and of an outlet connection T1 or outlet connections T1 and T2 of the specific embodiment of FIGS. 1 through 5 may also deviate. It is conceivable, for example, that one should provide an outlet connection that is "centrical" in the drawing, and a "left" and a "right" inlet connection. This is not shown, however, in FIGS. 1 to 5.

Figure 6:
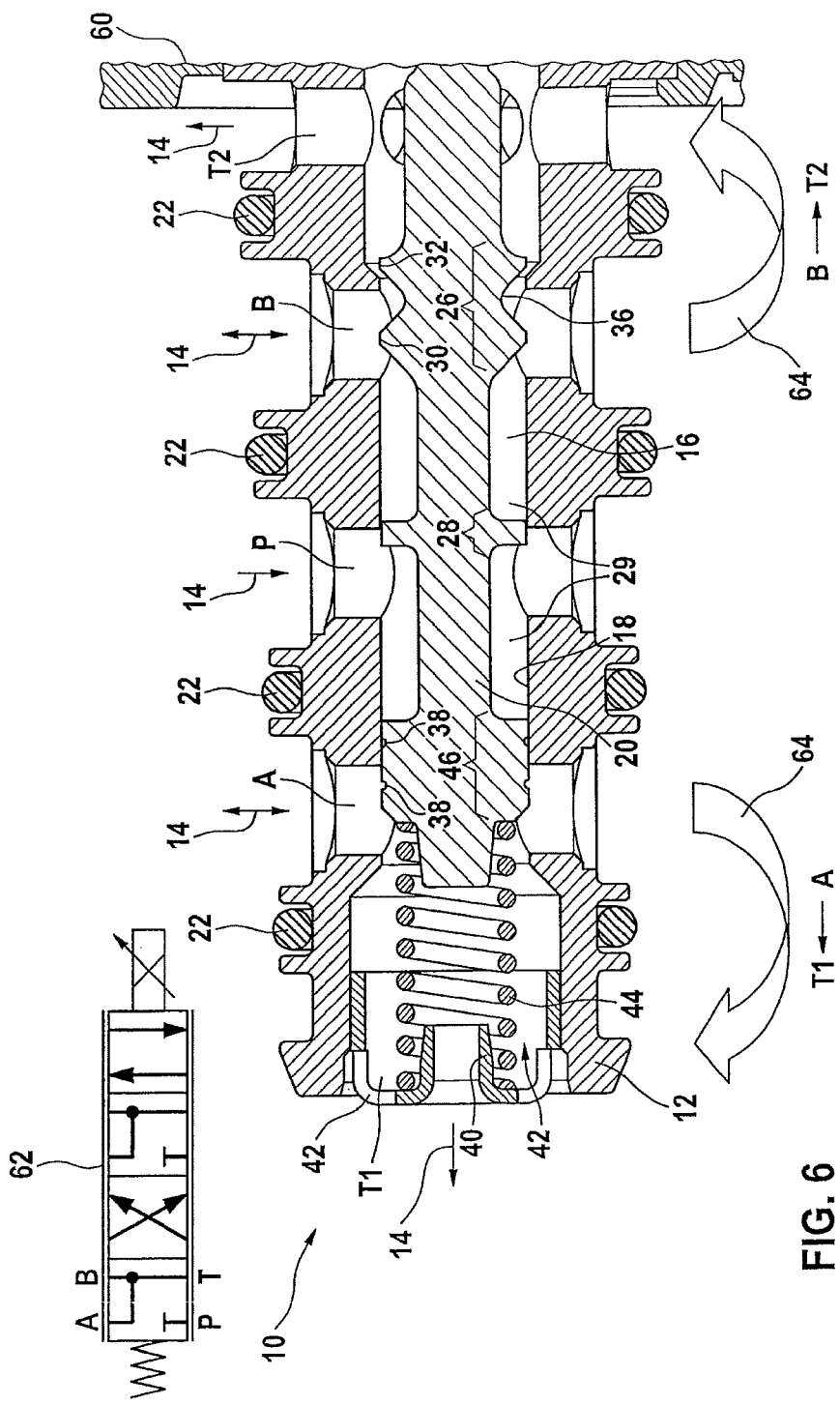
FIG. 6 a sectional view of the slide valve in a second specific embodiment and in a first position.

FIGS. 6 to 9 show an axial section of a second specific embodiment of slide valve 10, in a sectional representation. In contrast to FIGS. 1 to 5, the impinging device or valve spring 44 is situated in the left, rather than in the right area of the drawing. Actuator 48 as well as stop 52 and a section of valve slide 20, which is able to strike against stop 52, in FIG. 6 are located to the right of a break edge 60, and are not visible in the drawing. Slide valve 10 and valve slide 20 are executed at least partially rotationally symmetrical about a longitudinal axis 24. Furthermore, in FIGS. 5 to 9, first working connection is designated by B and second working connection by A, and first outlet connection is designated by T2 and the second outlet connection by T1, that is, exactly the opposite to those of FIGS. 1 to 5.

Starting from an end section, at the left in the drawing, of slide valve 10 or valve slide 20, which is impinged upon by valve spring 44, slide valve 10 of FIG. 6 includes second outlet connection T1, second working connection A, inlet connection P, first working connection B and first outlet connection T2. First control section 26 is assigned hydraulically to first working connection B, second control section 28 is assigned hydraulically to inlet connection P, and third control section 46 is hydraulically assigned to second working connection A.

First control section 26 includes first and second subcontrol section 30 and 32 and recess 36, that is situated axially between them and is radially encircling, in an approximately v-shaped manner in the axial sectional view. Second control section 28 has an axial length which is clearly shorter than the diameter or the axial opening width of inlet connection P. Third control section 46 has an axial length which corresponds approximately to the diameter or the axial opening width of first working connection A.

In the drawing, at top left, a hydraulic circuit 62 is drawn in, that corresponds to the present state of slide valve 10. Arrows 14 illustrate the possible flow directions of a fluid 16 provided at the respective connections. Two arrows 64 in the lower area of the drawing symbolize possible hydraulic flows.

In FIG. 6, actuator 48 is not supplied with current and valve spring 44 presses valve slide 20 to the right in the drawing, against stop 52 (not shown) into a first axial position. Thereby there comes about the following behavior of slide valve 10:

second subcontrol section 32, together with radially encircling recess 36, enables a hydraulic connection between first working connection B and first outlet connection T2;

second control section 28 blocks the hydraulic connection between inlet connection P and first working connection B;

third control section 46 enables a hydraulic connection between first working connection A and second outlet connection T1, and blocks the hydraulic connection between second working connection A and inlet connection P.

Figure 7:
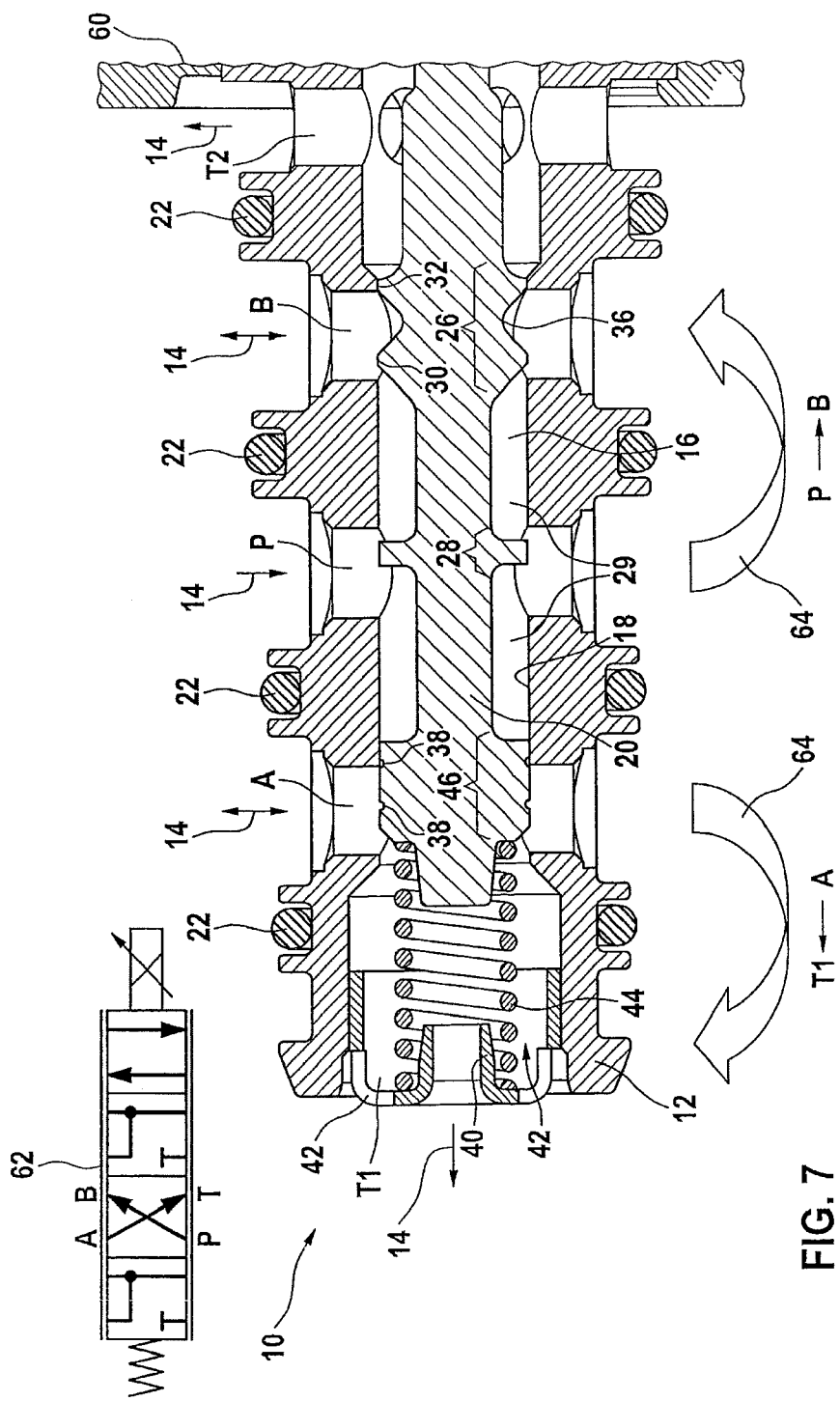
FIG. 7 a sectional view of the slide valve in FIG. 6 in a second position.

FIG. 7 shows slide valve 10 of FIG. 6 in a state in which actuator 48 is being actuated using a first energy or a first current (for instance, one-third of a maximum current). Because of this, actuator 48 acts upon valve slide 20 using a first force. With respect to FIG. 6, valve slide 20 of FIG. 7 is thus shifted to the left in the drawing by a first measure, not having a reference numeral, against the force of valve spring 44. Thereby there comes about the following behavior of slide valve 10:

second subcontrol section 32 blocks the hydraulic connection between inlet first working connection B and first outlet connection T2;

first subcontrol section 30 and second control section 28 enables an hydraulic connection between inlet connection P and first working connection B;

third control section 46 enables an hydraulic connection between second working connection A and second outlet connection T1, and blocks the hydraulic connection between second working connection A and inlet connection P.

Figure 8:
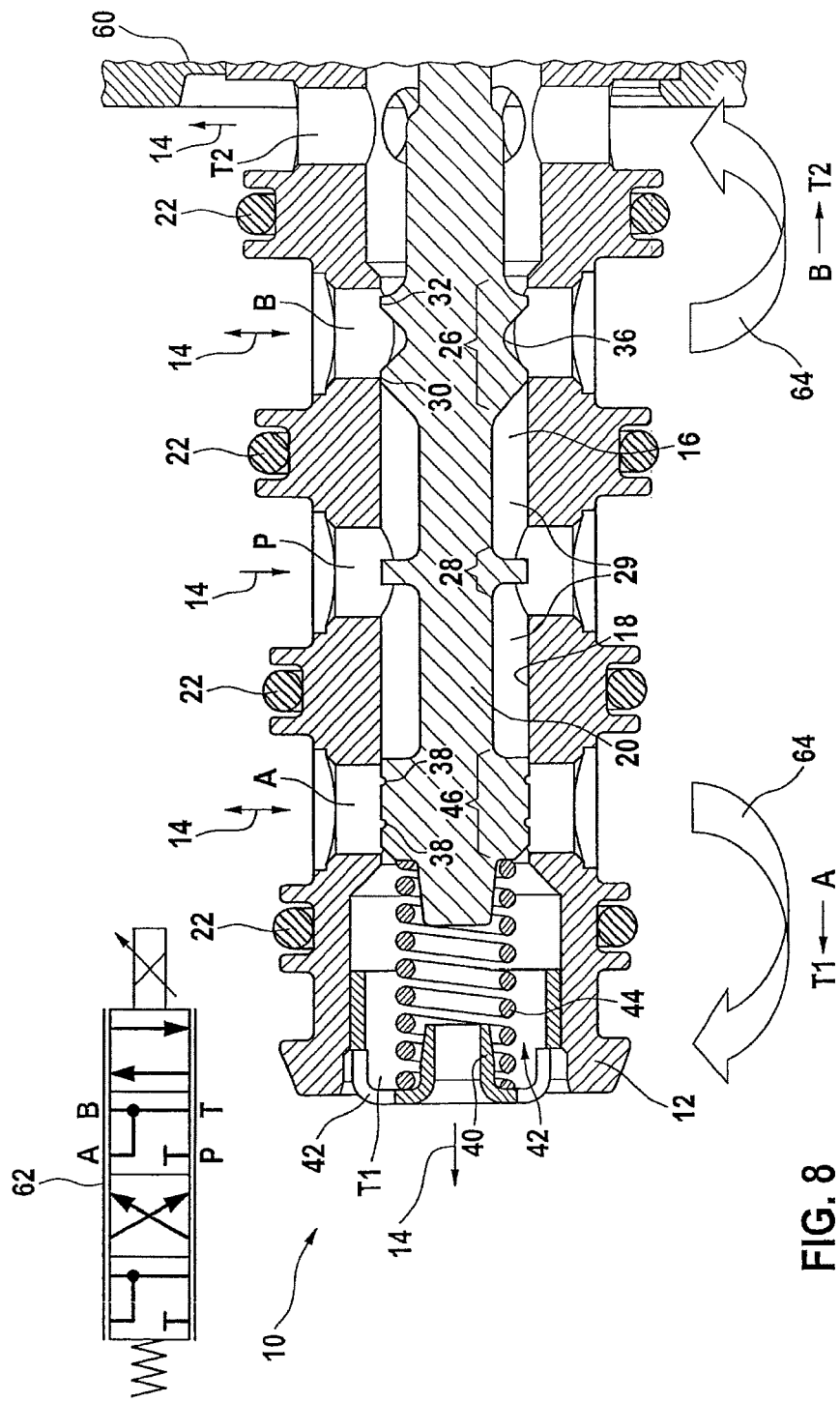
FIG. 8 a sectional view of the slide valve in FIG. 6 in a third position.

FIG. 8 shows slide valve 10 of FIG. 6 in a state in which actuator 48 is being actuated using a second energy or a second current (for instance, two-thirds of the maximum current). Because of this, actuator 48 acts upon valve slide 20 using a second force. With respect to FIG. 6, valve slide 20 of FIG. 8 is consequently displaced to the left in the drawing, by a second measure (not having a reference numeral) which is greater, with reference to FIG. 7, against the force of valve spring 44. Thereby there comes about the following behavior of slide valve 10:

second subcontrol section 32 enables an hydraulic connection between first working connection B and first outlet connection T2;

second subcontrol section 30 blocks the hydraulic connection between inlet connection P and first working connection B;

second control section 28 is essentially without effect;

third control section 46 enables an hydraulic connection between second working connection A and second outlet connection T1, and blocks the hydraulic connection between second working connection A and inlet connection P.

Figure 9:
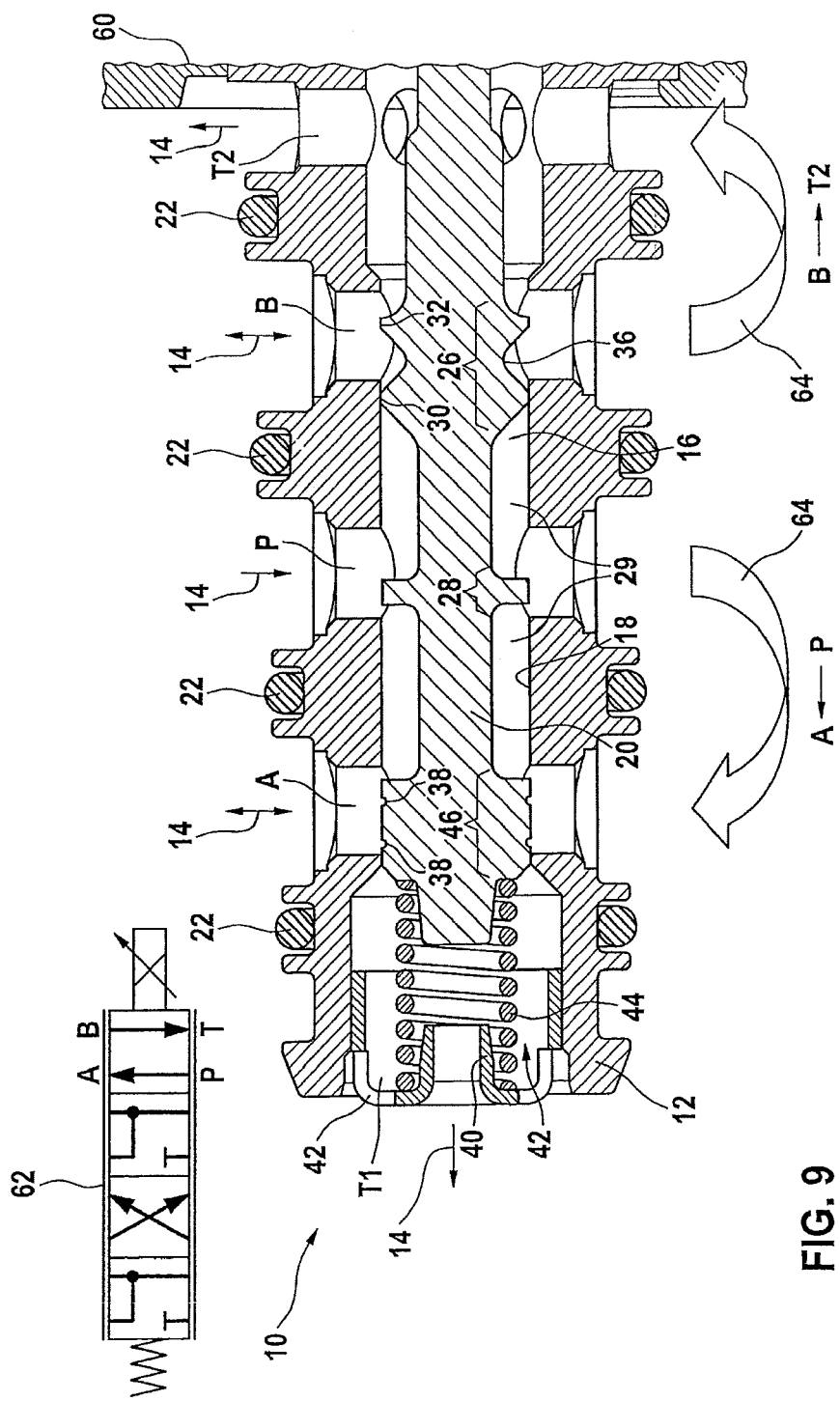
FIG. 9 a sectional view of the slide valve in FIG. 6 in a fourth position.

FIG. 9 shows slide valve 10 of FIG. 6 in a state in which actuator 48 is being actuated using a third energy or a third current (for instance, the maximum current). Because of this, actuator 48 acts upon valve slide 20 using a third force. With respect to FIG. 6, valve slide 20 of FIG. 9 is thus shifted to the left in the drawing by a third measure (not having a reference numeral), which is greater with respect to that in FIG. 8, against the force of valve spring 44. Thereby there comes about the following behavior of slide valve 10:

second subcontrol section 32 enables an hydraulic connection between first working connection B and first outlet connection T2;

first subcontrol section 30 blocks the hydraulic connection between inlet connection P and first working connection B;

second control section 28 and third control section 46 enable a hydraulic connection between inlet connection P and second working connection A. Third control section 46 also blocks the hydraulic connection between second working connection A and outlet connection T1.

What is claimed is:

1. A slide valve, comprising:
a valve slide, which is able to be impinged upon by an actuator in a first direction and by an impinging device in a second direction opposite to the first direction, and which, using control sections is able to connect hydraulically a first working connection to one of an inlet connection and an outlet connection, and a second working connection to one of the inlet connection and the outlet connection, wherein:
a first control section assigned to the first working connection includes at least a first subcontrol section and a second subcontrol section, and a recess that is situated axially between the first subcontrol section and the second subcontrol section, the recess being radially encircling and able to connect hydraulically the first working connection to the outlet connection as a function of an axial position of the valve slide;
a second control section is assigned to the inlet connection, such that the second control section, as a function of the axial position of the valve slide, is able to connect the inlet connection hydraulically alternatively to one of the first working connection and the second working connection; and
at least one of an axial position and an axial measure of the first control section and the first and second subcontrol sections and at least one of an axial position and an axial measure of the second control section and of a third control section with respect to the valve slide are dimensioned in such a way that, if the actuator does not act upon the valve slide, the first working connection is hydraulically connected to the outlet connection.

2. The slide valve as recited in claim 1, wherein starting from an end section of the valve slide, which is impinged upon by the impinging device, a first outlet connection, the first working connection, the inlet connection, the second working connection, and a second outlet connection are situated in an axial sequence.

3. The slide valve as recited in claim 1, wherein starting from an end section of the valve slide, which is impinged upon by the impinging device, a second outlet connection, the second working connection, the inlet connection, the first working connection, and a first outlet connection are situated in an axial sequence.

4. The slide valve as recited in claim 1, wherein a ratio of an axial length of the first control section to an extension of the first working connection parallel to a longitudinal axis of the valve slide has a value of approximately 0.9 to 1.1, corresponding to a formula $$\frac{h\_piston}{h\_channel} = 0.9 \text{ to } 1.1.$$

5. The slide valve as recited in claim 1, wherein a ratio of a sum of an axial length of the first and the second subcontrol sections and an axial length of a control area assigned to the first control section on a longitudinal bore of the slide valve radially guiding the valve slide to an axial length of the first control section has a value of approximately less than, or equal to 0.7, corresponding to a formula $$\frac{a+b+c}{h\_piston} \leq 0,7.$$

6. The slide valve as recited in claim 1, wherein:
if the actuator acts upon the valve slide with a first force, the first working connection is hydraulically connected to the inlet connection and the second working connection is hydraulically connected to the outlet connection, if the actuator is acting upon the valve slide with a second force, the first working connection is hydraulically connected to the outlet connection and the second working connection is hydraulically connected to the outlet connection, and if the actuator acts upon the valve slide with a third force, the first working connection is hydraulically connected to the outlet connection and the second working connection is hydraulically connected to the inlet connection.

7. An automatic transmission for a motor vehicle, which is able to be operated by at least one double-acting hydraulic cylinder, comprising:
- a slide valve that includes:
  - a valve slide, which is able to be impinged upon by an actuator in a first direction and by an impinging device in a second direction opposite to the first direction, and which, using control sections is able to connect hydraulically a first working connection to one of an inlet connection and an outlet connection, and a second working connection to one of the inlet connection and the outlet connection, wherein:
  - a first control section assigned to the first working connection includes at least a first subcontrol section and a second subcontrol section, and a recess that is situated axially between the first subcontrol section and the second subcontrol section, the recess being radially encircling and able to connect hydraulically the first working connection to the outlet connection as a function of an axial position of the valve slide;
  - a second control section is assigned to the inlet connection, such that the second control section, as a function of the axial position of the valve slide, is able to connect the inlet connection hydraulically alternatively to one of the first working connection and the second working connection; and
  - at least one of an axial position and an axial measure of the first control section and the first and second subcontrol sections and at least one of an axial position and an axial measure of the second control section and of a third control section with respect to the valve slide are dimensioned in such a way that, if the actuator does not act upon the valve slide, the first working connection is hydraulically connected to the outlet connection.

\* \* \* \* \*